United States Patent [19]

Gebler

[11] Patent Number: 4,567,460

[45] Date of Patent: Jan. 28, 1986

[54] TESTING DEVICE APPARATUS AND METHOD FOR TIRE PRESSURE OF AUTOMOTIVE VEHICLE WHEELS

[75] Inventor: Eugen Gebler, Munich, Fed. Rep. of Germany

[73] Assignee: Bayerische Motoren Werke AG, Fed. Rep. of Germany

[21] Appl. No.: 451,274

[22] Filed: Dec. 20, 1982

[30] Foreign Application Priority Data

Dec. 24, 1981 [DE] Fed. Rep. of Germany ....... 3151254

[51] Int. Cl.[4] ................ B60C 23/00; B60C 23/02
[52] U.S. Cl. .................................. 340/58; 73/146.5
[58] Field of Search ..................... 73/146.4, 146.5; 340/58, 626, 52 R; 116/34 R; 200/61.22, 61.23, 61.24, 61.25

[56] References Cited

U.S. PATENT DOCUMENTS

| 2,741,673 | 4/1956 | Metcalf | 340/58 |
| 3,900,828 | 8/1975 | Lage et al. | 340/58 |
| 4,275,377 | 6/1981 | Matsuda | 73/146.5 X |
| 4,355,298 | 10/1982 | Jessup | 340/58 |

FOREIGN PATENT DOCUMENTS 0008411 1/1983 Japan ..................... 340/58

Primary Examiner—James J. Groody
Attorney, Agent, or Firm—Craig and Burns

[57] ABSTRACT

In a testing apparatus and method for the tire pressure of automotive vehicle wheels, individual testing units for each wheel are arranged outside of the wheels at their suspension members. Only a single wheel is provided with an additional calibrating means for an exact tire pressure determination, in order to provide a calibrating standard for the relative measurement of the tire pressures of the wheels which can be performed with the aid of the testing units to produce a warning indication of low tire pressure.

10 Claims, 2 Drawing Figures

TESTING DEVICE APPARATUS AND METHOD FOR TIRE PRESSURE OF AUTOMOTIVE VEHICLE WHEELS

The invention relates to a testing device for the tire pressure of automotive vehicle wheels with individual testing units for each wheel.

In conventional testing devices of this type, the testing units are mounted to each wheel. In this arrangement, the danger of damage to the testing units is great. Furthermore, mounting of the tire is frequently made difficult. Also, installation problems occur due to the additional space required for the testing units, especially at the front wheels since the space available at such location is occupied extensively by braking members and chassis parts.

The invention provides a testing device of the above-discussed type permitting an exact determination of the tire air pressure for all wheels of the vehicle.

The testing units are arranged outside of the wheels at the suspension members thereof, and only a single wheel is equipped with an additional calibrating device to determine the one tire pressure value.

A relative determination of the tire pressure of the wheels is possible with the aid of the testing units. The calibrating device yields information as to the extent to which deviations of the relative tire pressure values from a desired value or a desired characteristic are tolerable.

The space requirement for the device in total, especially at the critical locations in the proximity of the wheels, is considerably reduced by the invention, since only the calibrating device must be arranged in this zone. The testing units can be accommodated outside of this zone.

On account of the function of the calibrating device, namely to yield a yardstick or starting point for the relative determination of the tire pressure of the wheels, it makes no difference which of the wheels is chosen for mounting the calibrating device. Since, especially in the region of the front wheels, space is restricted, the calibrating device can be readily arranged on a rear wheel.

The indirect determination of the tire pressure of the wheels with the aid of the testing units can take place in various ways. Thus, it is possible to individually compare the output signals of each of the testing units with stored desired values. In contrast thereto, such storage devices can be omitted if the output signals of the testing units are compared with one another. In this case, there is the possibility of comparing, for each wheel, the output signals of the testing units of the other wheel on the same axle and of the wheel on the same vehicle side. Thereby any effects on the output signals of the testing units due to fluctuations in or the unilateral nature of the load of the vehicle, or also various influences exerted by outside factors, such as sunlight, for example, can be readily eliminated.

Testing units based on different working principles can be utilized for such a comparison. Thus, it is possible, for example, to employ acceleration pickups or transducers as testing units, with the aid of which the acceleration of the suspension members is sensed. As an alternative, displacement pickups can also be utilized sensing the distance of the suspension members from the roadway surface. In either case, the output signals of the testing units are dependent on the tire pressure of the associated wheel. In case of an acceleration pickup, a reduction in tire air pressure manifests itself by a reduction in high oscillation frequencies and/or by a diminishing of the oscillation amplitudes of the suspension members. In contrast thereto, in a displacement pickup, such a reduction in tire pressure is perceived by an increasing drop in the static and/or dynamic distance of the suspension members.

It is thus an object of the invention to provide an improved testing device for tire pressure of automotive vehicle wheels.

It is a further object of the invention to provide a testing device for tire presure permitting an exact determination of tire air pressure for all wheels of the vehicle.

It is another object of the invention to provide a testing device for tire pressure of automotive vehicle wheels wherein testing units are arranged outside of the wheels at suspension members thereof and only a single wheel is equipped with an additional calibrating device to determine the single tire pressure value.

It is another object of the invention to provide relative determination of tire pressure by means of testing units.

It is another object of the invention to provide a testing device for tire pressure of automotive vehicle wheels wherein deviation of relative tire pressure values from a desired value or characteristic is determined as tolerable.

It is another object of the invention to provide a testing device for tire pressure of automotive vehicle wheels requiring a reduced space utilization in the proximity of the wheels.

It is another object of the invention to produce an apparatus and method for indicating a warning of a low tire pressure.

These and other objects, features, and advantages of the present invention will become more apparent from the following description when taken in connection with the accompanying drawings which show, for the purposes of illustration only, one embodiment in accordance with the present invention, and wherein.

Figure 1:
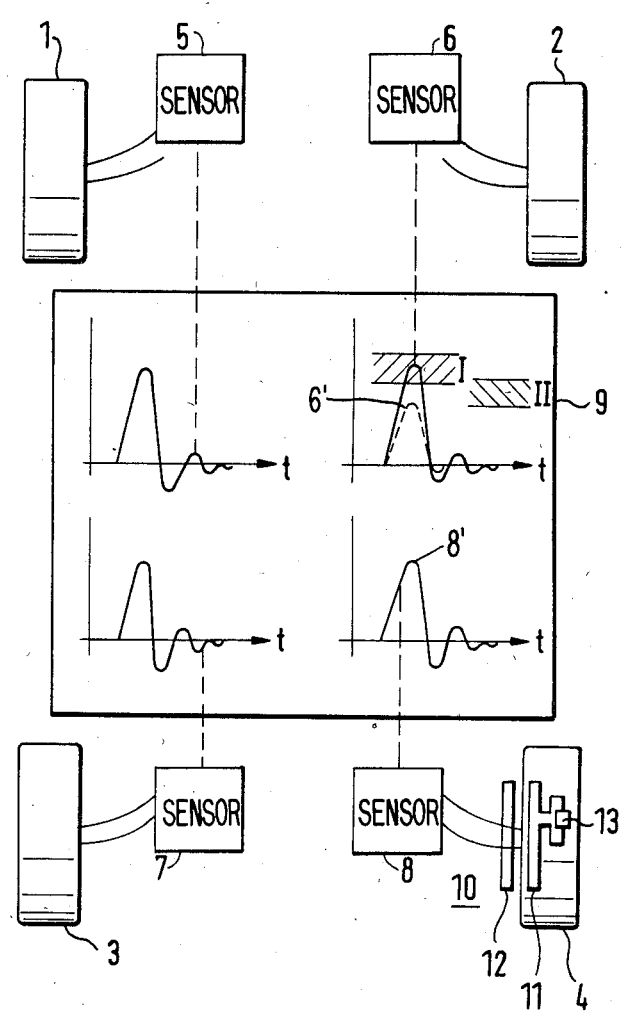
FIG. 1 shows a schematic diagram of the invention.

In FIG. 1, a schematically illustrated testing device for the tire air pressure of wheels on vehicles comprises respectively one acceleration pickup 5 through 8 for the two front wheels 1 and 2 and the two rear wheels 3 and 4. This pickup is mounted outside of the wheel zone at the suspension members of the wheels. The acceleration pickups 5–8 transmit, for example when an unevenness in the roadway is traversed, output signals to a comparison unit 9; these output signals have approximately the same shape. Apart from the phase shift of the output signals for the two front wheels 5 and 6 and the rear wheels 7 and 8, respectively, dependent on the velocity of the vehicle, the shape of these output signals is dependent on various factors. These are, inter alia, the stress on the wheels due to the loading and the longitudinal and transverse acceleration of the vehicle, as well as external influences, such as ambient temperature and effects of heat and finally, as the most important, the tire pressure.

By comparing the output signals of the wheels of one axle and of one vehicle side, all of these factors, except for the tire pressure, can be extensively eliminated. However, since the tire pressure of one tire or of all tires cannot be determined with the air of this comparison, a calibrating device 10 is arranged at one of the wheels, in the illustrated case at the rear wheel 4; with the aid of this device, the tire pressure can be exactly determined for this wheel. The calibrating device consists, for example, of two concentric coils 11 and 12, one coil 11 being mounted at the vehicle wheel and concentrically to the axis of the latter, and the other coil 12 being arranged in close proximity thereto at a suspension member of the wheel 4. The coil 11 has, for example, a variable inductance dependent on the tire pressure. A tire pressure pickup 13 serves for this purpose, for example, this pickup having an effect on the inductance of the coil 11. With the aid of coils 11 and 12, energy can be transmitted to an oscillatory circuit by means of coil 11, and a signal dependent on the tire pressure can be transmitted back to the coil 12.

It is possible with the aid of the calibrating device 10 to determine a standard for the output signals of the acceleration pickups 5-8 dependent on the actual value of the tire pressure for the wheel 4, by way of which a change in one of these output signals leads to the triggering of a warning signal and points to a pressure loss and/or an anomalous change in air pressure.

This will be explained in greater detail with reference to the illustrated diagram with the output signals of the acceleration pickups 5-8. The diagram shows the output signals, already screened with respect to the effects of the above-mentioned factors. These output signals represent the oscillation characteristic of the suspension members while running over an unevenness in the roadway. If one of the four tires loses air, the output signal of the acceleration pickup 6 is changed primarily in that the oscillation amplitudes become smaller. This is indicated in the diagram in dashed lines at 6' for the output signal of the acceleration pickup 6. However, this reduction in amplitude by itself cannot as yet readily yield a conclusion whether the pressure loss has indeed reached a critical level. The reason for this is that the factors inherent in the vehicle and in the surroundings normally cannot be entirely eliminated, inter alia that the effects of roadway unevennesses on the acceleration pickups are dependent on the value for the tire pressure. In case of a lower tire pressure, relatively large roadway unevennesses yield, in an approximation, the same acceleration amplitudes as relatively small roadway unevennesses at a higher tire pressure.

Although these influences could be perhaps eliminated by a complicated analysis of the entire output signals of the acceleration pickups 5-8, it is simpler, as contrasted to the above, merely to draw a conclusion with the aid of the calibrating device 10 of an undue pressure loss of the tire from the change in the maximum amplitude of the output signal. From the tire pressure for the wheel 4 determined with the aid of the calibrating device 10, a limit value for the maximum amplitude can be determined for each acceleration pickup 5-8, below which limit value a pressure loss is critical. The bandwidth is dependent on the tire pressure of the wheel 4 and illustrated in the diagram for relatively high (I) and low values (II), respectively, for this pressure.

Figure 2:
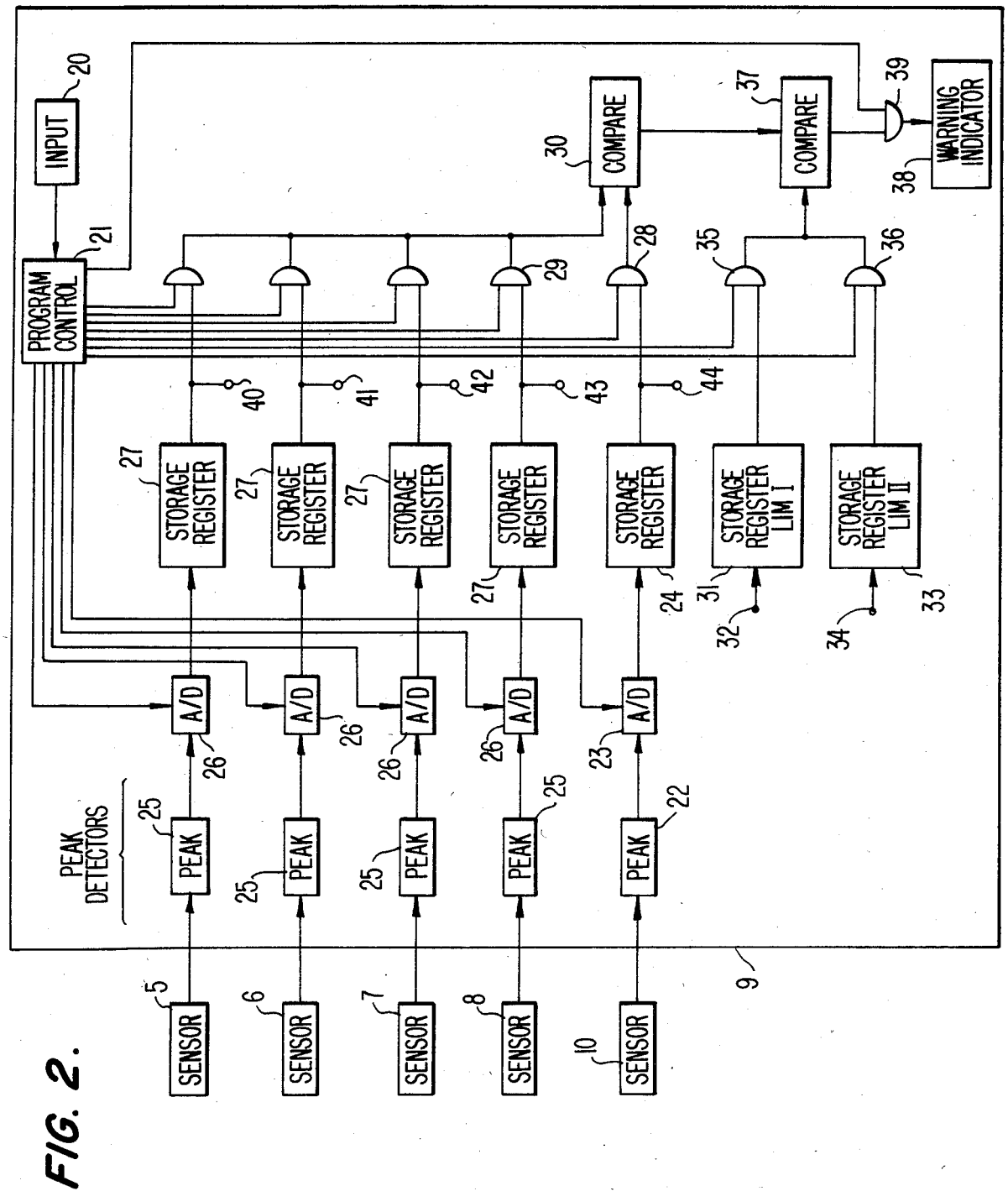
FIG. 2 shows details of a comparison unit.

Before describing in detail, the particular improved apparatus in accordance with the present invention as shown in FIG. 2 wherein like reference numerals represent like parts consonant with FIG. 1, it should be observed that the present invention resides primarily in the novel structural combination of conventional components and not in any particular detailed configuration thereof. Accordingly, the structure, control and arrangement of these conventional components are illustrated in FIG. 2 by readily understandable block representations in order not to obscure the disclosure with structural details which would be readily apparent to those skilled in the art having the benefit of the description herein. Thus, the block diagrams shown in FIGS. 1 and 2 do not necessarily represent the mechanical structural arrangement of the examplary system, but are primarily intended to illustrate the major components of the system in a conventional functional grouping so that the present invention can be more readily understood.

Comparison unit 9, as shown in FIG. 1 may take a form, as to circuit details, as shown in FIG. 2, the latter figure being an examplary showing, it being apparent that the artisan may find it expedient to configure the circuit in a variety of ways to achieve the results described. In one form, the comparison unit may take the form of a microprocessor consisting of one or more chips, the electronic architecture of which includes input and output circuitry, and arithmetic and program control units admitting of at least four-function arithmetic and attendant logic operations, storage or memory. Such a configuration may be tailored to the particular vehicle in which it is used with pre-stored program and data representing limits I and II described above.

Advantageously, such a configuration may also admit of manual control and manual data input whereby the program and data may be changed, if desired, by way of a keyboard or the like.

While higher level languages, such as FORTRAN and BASIC may be used, characteristically, economy of memory use and increased speed may be effected by the well known expedient of employing a lower level language such as ASSEMBLY language or MACHINE language.

Choice of architecture for the microcomputer together with language and programming technique, it will be recognized, is within the skill of those working in the art and, accordingly, the details thereof will not be introduced to this disclosure except insofar as the nature of the invention requires.

Under control of program control 21, data representing limit I and limit II may be introduced by the input device 20 and, via inputs 32 and 34, stored, respectively, in storage devices 31 and 33.

Sensing devices 5-10 provide inputs to comparison unit 9, as previously described in connection with FIG. 1.

The overall operation of comparison unit 9 is to effect, under the control of program control 21, a successive comparison of the signal input from calibration device 10 with the signal inputs from each of sensors 5-8. The result of that comparison is then matched against either or both of the data representing limits I and/or II, the results being determinative of whether a warning signal is to be generated.

In order to avoid needless repetition, the comparison operation will be described in connection with the signals input from calibration unit 10 and rear wheel sensor 8, it being understood that the successive comparisons will be made sequentially between the input signals of 10 and 8, 10 and 7, 10 and 6, and 10 and 5 under the control of program control 21.

Turning to the comparison of the input signals from calibrating device 10, the peak of the signal, 8' as shown in FIG. 1, may be sensed in a peak detector 22. Alternatively, a sample-and-hold circuit may be employed under the control of program control 21 to capture the peak value 8'.

The peak value is digitized by analog-digital converter 23 under the control of program control 21 and stored in 24. Similarly, the input signal from sensor 8 has its peak determined in 25, the value digitized in analog-digital converter 26, the result being stored in 27. Program control 21 serves to gate the values stored, respectively, in storage registers 24 and 27 into a comparator 30 via gates 28 and 29. Comparator 30 determines the difference between the two peak values, a subtraction, and generates a signal as an input to comparator 37, the magnitude of which represents the difference between the two signals input from calibrating device 10 and sensor 8. It will be appreciated that if the value of the output signal indicates that the signal sensed at input 8 is equal to or greater than the calibration signal, no warning is necessary. If the value of the signal sensed at sensor 8 is less than the calibration signal from sensor 10, it is necessary to determine whether the difference is greater than the value assigned as a limit, for example, limit I, the value of which is stored in register 31.

In order to make this determination, program control 21 gates the value of limit I from storage register 31 through gate 35 to be compared with the output of comparator 30 in comparator 37. If the resultant comparison, a subtraction, determines that limit I is equal or greater than the signal input from comparator 30, no warning signal is necessary. However, if the input from comparator 30 to comparator 37 is greater than limit I, the sign of the output signal will be negative, indicating the fact that the safety threshold of which limit I is representative, has been passed. When such as indication results in the output of comparator 37, gates 39 under the control of program control 21 will transmit to signal output and a warning signal is indicated by warning indicator 38.

Program control 21 will successively poll the A/D converters 23 and 26 to store peak values in storage registers 24 and 27, successively gating outputs from the storage register 27 for successive comparisons in comparator 30 with the output of register 24. Thus, the warning indicator 38 will identify low tire pressure if it is sensed by any of sensors 5-8.

If a second limit threshold is desired, comparable operations to those previously described may be effected using storage register 33 for limit II for example, gated through gate 36 under control of program control 21.

As previously described, other comparisons of the sensed signals from 5-8 may be effected, thus, the signals input from the front wheels from sensor 5 and 6 may be compared using storage outputs from terminals 40 and 41. In like manner, comparisons may be effected between the signals of the rear axle by comparing signals from 42 and 43. Similarly, comparisons may be effected between signals on the left side of the vehicle employing outputs from 40 and 42 while signals may be compared for the right side of the vehicle employing signals from 41 and 43 for comparison. It will be appreciated that, under control of program control 21, such comparisons may be effected.

Accordingly, the invention provides a testing device for the tire pressure of wheels at vehicles, which device is easy to install, inexpensive, and rugged and, apart from one exception, does not require interference with wheels and braking or suspension members. The method utilized for the device has been described in detail for acceleration pickups as the testing units. These explanations can be readily applied to other designs of the testing units, for example, in the form of displacement pickups. In any event, the method can be realized by means of commercially available electronic components.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A testing apparatus for wheeled road vehicles having suspension members for the wheels comprising
    first means mounted at the suspension members for sensing a characteristic of the suspension member adjacent each wheel with respect to the road,
    calibration means for sensing tire pressure of at least the tire of one of said wheels, and
    second means responsive to an output signal from said first means and to a signal from said calibration means for producing an output warning signal.

2. A testing apparatus in accordance with claim 1, wherein said calibration means comprises
    means for measuring inductance, and
    means attached to a wheel for varying the measured indication of inductance in response to a tire pressure of said wheel.

3. A testing apparatus in accordance with claim 2, wherein the means attached to the wheel is attached to a rear wheel.

4. A testing apparatus in accordance with claim 1, wherein said calibration means comprises
    first coil means mounted at a vehicle wheel of variable inductance for sensing tire pressure, and
    second coil means mounted at a suspension member of said vehicle for generating a signal representing a change in tire pressure.

5. A testing apparatus in accordance with claim 1, wherein the first means comprises
    means for measuring acceleration.

6. A testing apparatus in accordance with claim 1, wherein said second means comprises
    means for determining a change in air pressure in a tire of a wheel in response to a change in oscillation frequency of said characteristic.

7. A testing apparatus in accordance with claim 1, wherein said second means comprises
    means for determining a change in air pressure in a tire of a wheel in response to a change in amplitude of said characteristic.

8. A testing apparatus in accordance with claim 1, further comprising
    third means in response to said output signal and a signal representing an established limit for generating a warning signal indicating a low tire pressure.

9. A method for determining air pressure of a tire on a wheeled vehicle having a plurality of wheels and a vehicle body comprising
    sensing at said plurality of wheels a characteristic of vehicle motion with respect to a road surface to produce a first signal, sensing additionally a characteristic of motion of one of said wheels with respect to the vehicle body to produce a second signal, and generating a warning signal in response to said first and second signals.

10. A method in accordance with claim 9, wherein the generating step comprises comparing said first and second sensed signals to produce a difference signal, and comparing said difference signal with a signal representing a tire pressure limit to produce said warning signal.

* * * * *